US007567847B2

(12) United States Patent
Basson et al.

(10) Patent No.: US 7,567,847 B2
(45) Date of Patent: Jul. 28, 2009

(54) PROGRAMMABLE AUDIO SYSTEM

(75) Inventors: Sara H. Basson, White Plains, NY (US); Alexander Faisman, Croton-on-Hudson, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 11/199,504

(22) Filed: Aug. 8, 2005

(65) Prior Publication Data

US 2007/0028749 A1 Feb. 8, 2007

(51) Int. Cl.
*G10H 1/00* (2006.01)
*G06F 17/00* (2006.01)

(52) U.S. Cl. ........................... 700/94; 715/716; 84/601

(58) Field of Classification Search .................... 700/94
See application file for complete search history.

(56) References Cited

U.S. PATENT DOCUMENTS 5,952,599 A * 9/1999 Dolby et al. .................. 84/649
6,011,212 A * 1/2000 Rigopulos et al. ............. 84/667
6,018,118 A * 1/2000 Smith et al. ................... 84/600
6,316,710 B1 * 11/2001 Lindemann .................. 84/609
6,388,183 B1 * 5/2002 Leh ............................. 84/645
6,549,750 B1 4/2003 Iggulden
6,687,193 B2 * 2/2004 Jung ............................. 369/4
6,740,802 B1 5/2004 Browne, Jr.
6,815,600 B2 11/2004 Georges et al.
7,129,927 B2 * 10/2006 Mattsson ..................... 345/158
7,402,743 B2 * 7/2008 Clark et al. .................... 84/615
2002/0118848 A1 * 8/2002 Karpenstein ................ 381/119
2003/0159567 A1 * 8/2003 Subotnick .................... 84/626
2004/0023697 A1 2/2004 Komura
2004/0055447 A1 3/2004 Childs, Jr. et al.
2004/0224638 A1 * 11/2004 Fadell et al. ............... 455/66.1
2004/0231496 A1 11/2004 Schwartz
2004/0243482 A1 12/2004 Laut
2005/0010952 A1 1/2005 Gleissner et al.
2006/0167576 A1 * 7/2006 Rosenberg ................... 700/94
2007/0044641 A1 * 3/2007 McKinney et al. ............ 84/612

* cited by examiner

*Primary Examiner*—Curtis Kuntz
*Assistant Examiner*—Paul McCord
(74) *Attorney, Agent, or Firm*—Schmeiser, Olsen & Watts; William E. Schiesser

(57) ABSTRACT

An audio system and method. The audio system comprises a sensing device and a memory device. The memory device comprises a list of groups of gesture types. A first specified audio sound is stored within the memory device. A user programs a first association between the first specified audio sound and a first specified gesture received by the sensing device. The first specified gesture is associated with a first group from the list of groups. The first association is stored within the memory device. The audio file is amplified by the audio system. The user uses the sensing device to perform the first specified gesture. The audio system recognizes the first specified gesture as a gesture from the first group. The audio system enables and amplifies the first specified audio sound and integrates the first specified audio sound with the audio file.

18 Claims, 5 Drawing Sheets

PROGRAMMABLE AUDIO SYSTEM

BACKGROUND OF THE INVENTION

1. Technical Field

The present invention relates to a system and associated method for associating gestures with audio sounds in an audio system.

2. Related Art

Combining multiple audible sounds with music within a system typically requires a plurality of components. Using a plurality of components may be cumbersome and costly. Therefore there exists a need for a low cost, portable system to allow a user to combine multiple audible sounds with music within a system.

SUMMARY OF THE INVENTION

The present invention provides a method, comprising:

providing an audio system comprising a sensing device and a memory device, said memory device comprising a list of groups of gesture types;

storing within said memory device, a first specified audio sound;

programming by a user, a first association between said first specified audio sound and a first specified gesture received by said sensing device;

associating said first specified gesture with a first group from said list of groups;

storing within said memory device, said first association in a first directory for said first group;

amplifying by said audio system, an audio file;

using by said user, said sensing device to perform said first specified gesture;

recognizing by said audio system, said first specified gesture as a gesture from said first group;

enabling by said audio system, said first specified audio sound;

integrating by said audio system, said first specified audio sound with said audio file; and amplifying by said audio system, said first specified audio sound.

The present invention provides a method, comprising:

providing an audio system comprising a sensing device, a memory device, and a download controller module;

storing within said memory device, a first specified audio sound;

programming by a user, a first association between said first specified audio sound and a first specified gesture received by said sensing device;

storing within said memory device, said first association;

locating by said audio system, an audio file from an external audio file source;

determining by said download controller module, that said audio file is available for downloading by said audio system;

downloading by said audio system, said audio file;

amplifying by said audio system, said audio file;

using by said user, said sensing device to perform said first specified gesture;

recognizing by said audio system, said first specified gesture;

enabling by said audio system, said first specified audio sound;

integrating by said audio system, said first specified audio sound with said audio file; and amplifying by said audio system, said first specified audio sound.

The present invention provides audio system comprising a processor coupled to a memory unit and a sensing device, said memory unit comprising a list of groups of gesture types and instructions that when executed by the processor implement an association method, said method comprising;

storing within said memory unit, a first specified audio sound;

programming by a user, a first association between said first specified audio sound and a first specified gesture received by said sensing device;

associating said first specified gesture with a first group from said list of groups;

storing within said memory unit, said first association in a first directory for said first group;

amplifying by said audio system, an audio file;

using by said user, said sensing device to perform said first specified gesture;

recognizing by said audio system, said first specified gesture as a gesture from said first group;

enabling by said audio system, said first specified audio sound;

integrating by said audio system, said first specified audio sound with said audio file; and amplifying by said audio system, said first specified audio sound.

The present invention advantageously provides a portable system and associated method to allow a user to combine multiple audible sounds with music within a system.

BEST MODE FOR CARRYING OUT THE INVENTION

Figure 1:
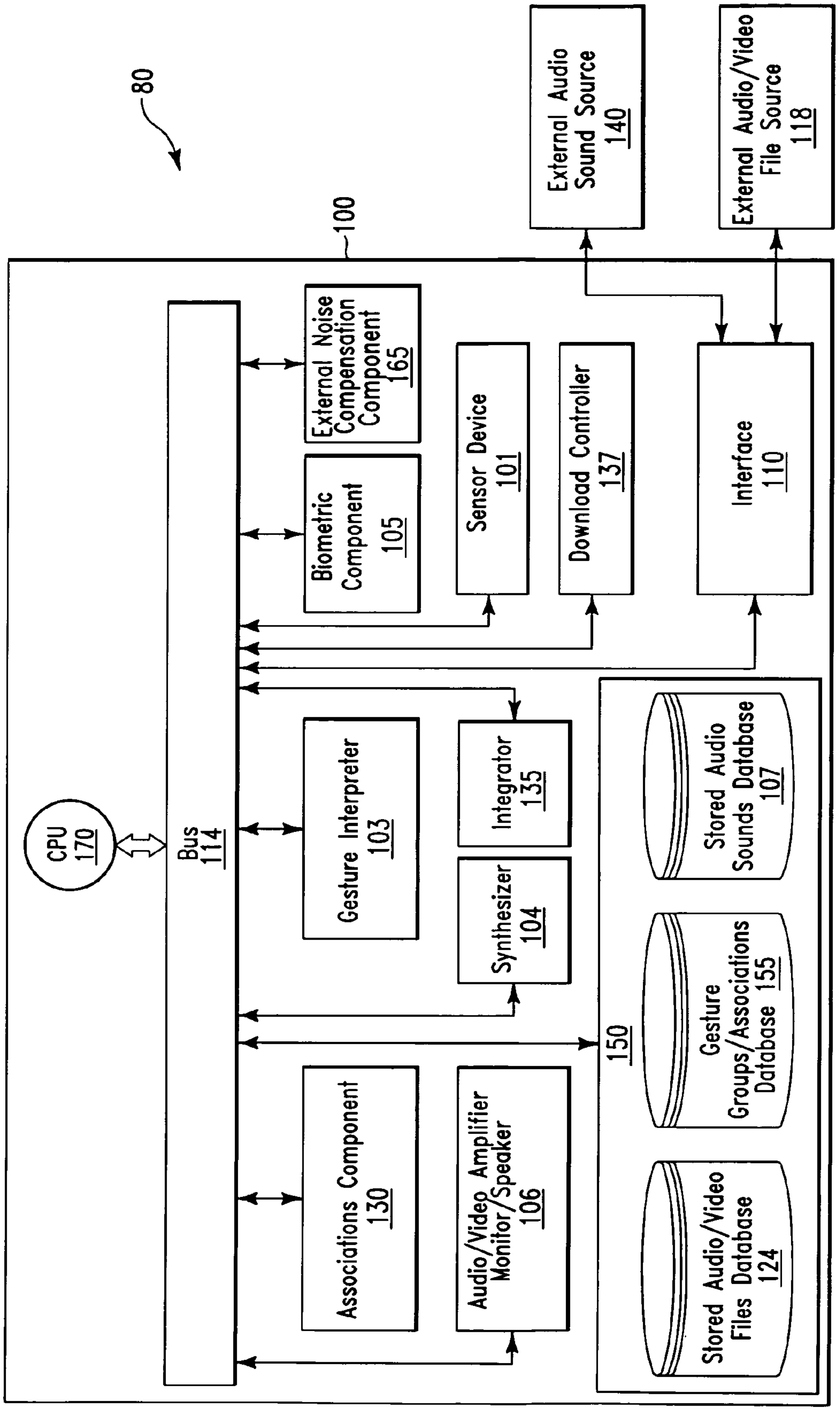
FIG. 1 illustrates a block diagram view of an audio system for enabling a user to integrate custom audio sounds with an existing stream of audio/video, in accordance with embodiments of the present invention.

FIG. 1 illustrates a block diagram view of an audio system 80 for enabling a user to integrate custom audio sounds with an existing stream of audio, in accordance with embodiments of the present invention. Portable audio devices (e.g., an IPOD®, a compact disc player, a personal digital assistant (PDA), a radio receiver, etc.) are very popular with many people. Audio system 80 of FIG. 1 allows a user to create various audio sounds (e.g., percussion sounds, piano sounds, guitar sounds, etc.) and integrate at various intervals, the various audio sounds, with a stream of audio (e.g., a song) that is being played by a portable audio device. The stream of audio may be associated with a stream of video (e.g., a movie). Audio system 80 comprises an audio device 100 (e.g., an IPOD®, a compact disc player, a video player, a personal digital assistant, a radio receiver, etc.), an external audio sound/audio segment generation source(s) 140, and an external audio/video file source(s) 118. Audio device 100 may be, inter alia, a computing device. Audio device 100 may alternatively be an audio/video device for playing audio/video file such as, inter alia, a movie. Audio device 100 comprises an embedded sensor device 101 (e.g., a touch pad sensor), an associations component 130, a gesture interpreter 103, and a plurality of components as described, infra. Associations component 130 is used to program associations between several user gestures and several audio sounds so that when the user touches/performs the programmed gesture, sensor device 101 is activated to enable an associated audio sound. Gesture interpreter 103 is used to activate audio device 100 to enable the pre-programmed audio sound when an associated gesture is performed. For example, the user could activate audio device 100 to enable pre-programmed percussion sounds by rhythmically touching in different manners, sensor device 101 (e.g., a touch pad sensor) while audio device 100 plays music (e.g., a song). Different gestures (e.g., sliding, scratching, "drawing" circles and other curves on sensor device 101) may be programmed and recognized by audio device 100 as discrete commands to activate different sound effects (i.e., audio sounds). Pre-programmed audio device 100 will recognize (i.e., by gesture interpreter component 103) a user intention (i.e., gesture) and produce audio sounds that may be added to an audio stream played by audio device 100. User may program audio device 100 (i.e., using associations component 130) to recognize his/her gestures in a "training" (i.e., programming) session in which the user may connect conventional external audio sound sources 140 (e.g., a piano, a drum, a guitar, etc) to audio device 100 via interface 110, generate the audio sounds using external audio sound sources 140, store the audio sounds, and associate gestures performed with sensor device 101 with the audio sounds (i.e., using associations component 130). The associations are stored in audio device 100 (i.e., in memory device 150). Alternatively, the user may program audio device 100 to recognize his/her gestures in a "training" (i.e., programming) session in which the user activates a synthesizer component 104 (within audio device 100) to generate the audio sounds (e.g., a piano, a drum, a guitar, etc) and associate gestures performed with sensor device 101 with the audio sounds generated by synthesizer component 104. Additionally, users could program audio device 100 to associate certain gesture types or groups (i.e., using associations component 130) with specific audio sounds and or audio levels. For example, the user could program audio device 100 to generate a drum sound when a circle figure (i.e., using a finger to "draw" on sensor device 101) is generated on sensor device 101 (e.g., a touch pad sensor) and a piano sound when a triangle figure (i.e., using a finger to "draw" on sensor device 101) is generated on sensor device 101 (e.g., a touch pad sensor). Different size circles could be used for generating different drum type sounds (e.g., bass drum sound, snare drum sound, bongo sound, etc) and different size triangles could be used to generate different piano sounds (e.g., different keys or musical notes, different piano types such as classical piano or electric piano, etc.). The groups of gesture types may be stored in memory device 150 as a list(s). Additionally, audio device 100 may be programmed based on sensitivity in response to gestures. For example, if sensor device 101 is activated with a light pressure (e.g., the user presses a finger on sensor device 101 lightly), audio device 100 may generate an audio sound (e.g., drum sound, piano sound, etc.) comprising a low audio level. As the user increases pressure (e.g., the user presses a finger on sensor device 101 with more pressure), audio device 100 may generate an audio sound (e.g., drum sound, piano sound, etc.) comprising a higher audio level. Additionally, audio device 100 may be programmed such that an increase in speed of a gesture will produce an increase in speed of the audio sound. Therefore, the user gestures are mapped to specific audio sounds and amplification levels for the specific audio so that different types of gestures will be associated with different types of audio sounds and/or levels. Audio device 101 may additionally comprise a biometrics component 105 to monitor a biometric condition of the user to sense a mood of the user and control gesture interpreter 103 to generate specific audio sounds or levels based on different biometric conditions (e.g., heart rate, blood pressure, body temperature, etc.) and moods of the user. For example, if the user is happy, biometric component 105 may sense a specific heart rate or blood pressure and when sensor device 101 is activated a first type of audio sound (e.g., a piano sound) or audio level is generated by audio device 100. If the user is angry, biometric component 105 may sense a specific heart rate or blood pressure and when sensor device 101 is activated a second type of audio sound (e.g., a drum sound) or audio level is generated by audio device 100. Biometrics component 105 may comprise a plurality of biometric sensors including, inter alia, a microphone, a video camera, a humidity/sweat sensor, a heart rate monitor, a blood pressure monitor, a thermometer, etc.

Audio device 100 may comprise any audio device known to a person of ordinary skill in the art such as, inter alia, an IPOD®, a compact disc player, a personal digital assistant (PDA), a radio receiver, etc. Audio device 100 comprises a central processing unit (CPU) 170, a bus 114, an associations component 130, a gesture interpreter 103, a biometrics component 105, an audio/video amplifier and speaker/monitor 106, a synthesizer 104, a sensor device 101, an interface 110, an external noise compensation component 165, an integrator 135, a download controller 137, and a memory device 150. Each of associations component 130, gesture interpreter 103, biometrics component 105, synthesizer 104, external noise compensation component 165, integrator 135, download controller 137, and interface 110 may comprise a hardware component, a software component, or any combination thereof. Sensor device 101 may comprise any sensor device known to a person of ordinary skill in the art including, inter alia, a touch pad sensor, a motion detector, a video camera, etc. Bus 114 connects CPU 170 to each of associations component 130, gesture interpreter 103, biometrics component 105, audio/video amplifier and speaker/monitor 106, synthesizer 104, sensor device 101, external noise compensation component 165, memory device 150, integrator 135, download controller 137, and interface 110 and allows for communication between each other. External audio/video file source(s) 118 provides an audio file source (e.g., a source for music files) for audio device 100. External audio/video file source 118 may comprise, inter alia, a radio transmitter, a database comprising music files (e.g., from an internet audio file/music source), etc. External audio/video file source(s) 118 is connected to audio device 100 through interface 110. Interface 110 may comprise, inter alia, radio frequency (RF) receiving circuitry, a modem (e.g., telephone, broadband, etc.), a satellite receiver, etc. Interface 110 retrieves audio files from external audio/video file source(s) 118 for audio device 100. The retrieved audio file(s) from external audio/video file source(s) 118 may comprise a live stream of audio (e.g., an RF or satellite radio broadcast) or audio files from a database (e.g., from an internet audio file/music source/service such as, inter alia, a pod casting service for an IPOD®), etc. Download controller 137 monitors any audio files that are to be retrieved by external audio/video file source 118 to determine that the audio files are available for retrieval. For example, the audio files may be selected from an internet directory (e.g., a pod casting directory) and may comprise copyright protection and require a fee prior to retrieval by external audio/video file source 118. In this instance, download controller 137 will not allow retrieval by external audio/video file source 118 unless the fee is paid to the distributor (e.g., a pod casting service) of the copyright protected audio/video files. The retrieved audio file(s) from external audio/video file source(s) 118 may be played by audio device 100 (i.e., by audio/video amplifier speaker/monitor 106) in real time without saving (i.e., as the audio file is retrieved from external audio/video file source(s) 118). Alternatively, the retrieved audio file(s) from external audio/video file source(s) 118 may be saved in a database 124 in memory device 150. Retrieved audio file(s) saved in database 124 may be played by audio device 100 (i.e., by audio/video amplifier speaker/monitor 106) at any time by the user. External audio sound source(s) 140 provides a source for audio sounds (i.e., to be associated with gestures) for audio device 100. The audio sounds generated by external audio sound source(s) 140 typically comprise short duration audio sounds or segments (e.g., less than about 5 seconds). For example, the audio sounds generated by external audio sound source(s) 140 may comprise, inter alia, a single note from a piano or string instrument, a single beat on a percussion instrument, a short blast of an automotive horn, etc. External audio sound source(s) 140 may comprise, inter alia, an instrument (e.g., a piano, a drum, a guitar, a violin, etc.). Alternatively, external audio sound source(s) 140 may comprise any source for generating audio sounds, such as, inter alia, an audio signal generator, a recording device, automotive sound source (e.g., an automotive horn), etc. External audio sound source(s) 140 is connected to audio device 100 via interface 110. The audio sounds (i.e., to be associated with gestures) generated by external audio sound source(s) 140 may be stored in database 107 in memory device 150. In addition to external audio sound source(s) 140, synthesizer component 104 may be used to generate audio sounds (i.e., to be associated with gestures). As with external audio sound source(s) 140, the audio sounds generated by synthesizer component 104 typically comprise short duration audio sounds or segments (e.g., less than about 5 seconds). For example, the audio sounds generated by synthesizer component 104 may comprise, inter alia, a single note from a piano or string instrument, a single beat on a percussion instrument, a short blast of an automotive horn, etc. Synthesizer component 104 may generate audio sounds associated with gestures in real time as the gestures are performed. Alternatively, synthesizer component 104 may generate audio sounds (i.e., to be associated with gestures) and the audio sounds may be stored in database 107 in memory device 150. Synthesizer component 104 may generate any type of audio sounds including, inter alia, musical instrument sounds (e.g., a piano, a drum, a guitar, a violin, etc). Associations component 130 in combination with sensor device 101 is used to program audio device 100 to recognize user(s) gestures and associate the user gestures with audio sounds generated by external audio sound source(s) 140 and/or synthesizer component 104. A programming algorithm is described with reference to FIG. 3. The user gestures may be categorized into groups of gesture types and each group may be associated with different variations of audio sounds as described, supra. Additionally, associations component 130 allows the user of audio device 100 to program audio device 100 based on a sensitivity (i.e., with respect to gestures) of sensor device 101 as described, supra. Associations component 130 in combination with biometrics component 105 may additionally enable the user to program specific audio sounds and or audio levels in response to specific gestures and biometric conditions (e.g., heart rate, blood pressure, body temperature, etc.) and moods of the user as described, supra. Biometrics component 105 may comprise biometric sensors (e.g., heart rate monitor, blood pressure monitor, thermometer, etc) for programming specific gestures and/or audio levels with respect to biometric conditions of the user. Additionally, biometric sensors may be used to monitor biometric conditions of the user during usage of audio device 100. During usage of audio device 100 (i.e., after programming user gestures and associations as described, supra), stored audio files (e.g., music) or a live audio stream (e.g., music) are amplified for the user of audio device 100 and gesture interpreter component 103 will recognize programmed user gestures received by sensor device 101 and enable associated audio sounds and levels and integrator 135 will integrate the associated audio sounds with the audio file/stream played by audio device 100. Additionally, integrator 135 may delay playing any more audio file/streams until the associated audio sound is integrated with the audio file/stream to account for amount of time occurring between the user gesture and an association to the associated audio sound. The audio file/stream and the integrated audio sounds may be saved as a new audio file in database 124 for future use or for sharing with others. For example, the user may post the new audio file on an internet service/website (e.g., a pod casting service) and other users of similar audio devices may download the new audio file. In this instance, potential users for the new audio file may view the posting for the new audio file on the internet service/website and request to download the new audio file. Download controller 137 will monitor the request to determine if the new audio file comprises any copyright protection/licensing issues and will not allow the requestor to download the new audio file unless the copyright protection/licensing issues are resolved. For example, a fee may be required before downloading and download controller 137 will not allow the requester to download the new audio file unless the fee is paid. A usage algorithm is described with reference to FIG. 4. Additionally, biometrics component 105 may monitor and adjust or modify the audio sounds and/or levels in response to biometric conditions/moods of the user. During usage of audio device 100, external noise compensation component 165 may compensate for unwanted external noises. For example, if an airplane flies overhead, a noise generated by the airplane may prevent and/or limit the user from listening to audio files and/or programmed audio sounds. External noise compensation component 165 may compensate for the noise generated by the airplane by automatically adjusting (e.g., raising) an audio level of the audio files and/or programmed audio sounds. Alternatively, external noise compensation component 165 may lower an audio level of the audio files and/or programmed audio sounds and integrate the noise generated by the airplane with the audio file and the programmed audio sounds. External noise compensation component 165 may comprise a microphone for monitoring external noises. Functions performed by associations component 130 (i.e., programming associations between audio sounds and gestures) and gesture interpreter 103 (i.e., associating gestures with audio sounds during usage) may be performed remotely on an internet server if it is too resource intensive to perform the functions within audio device 100.

Figure 2:
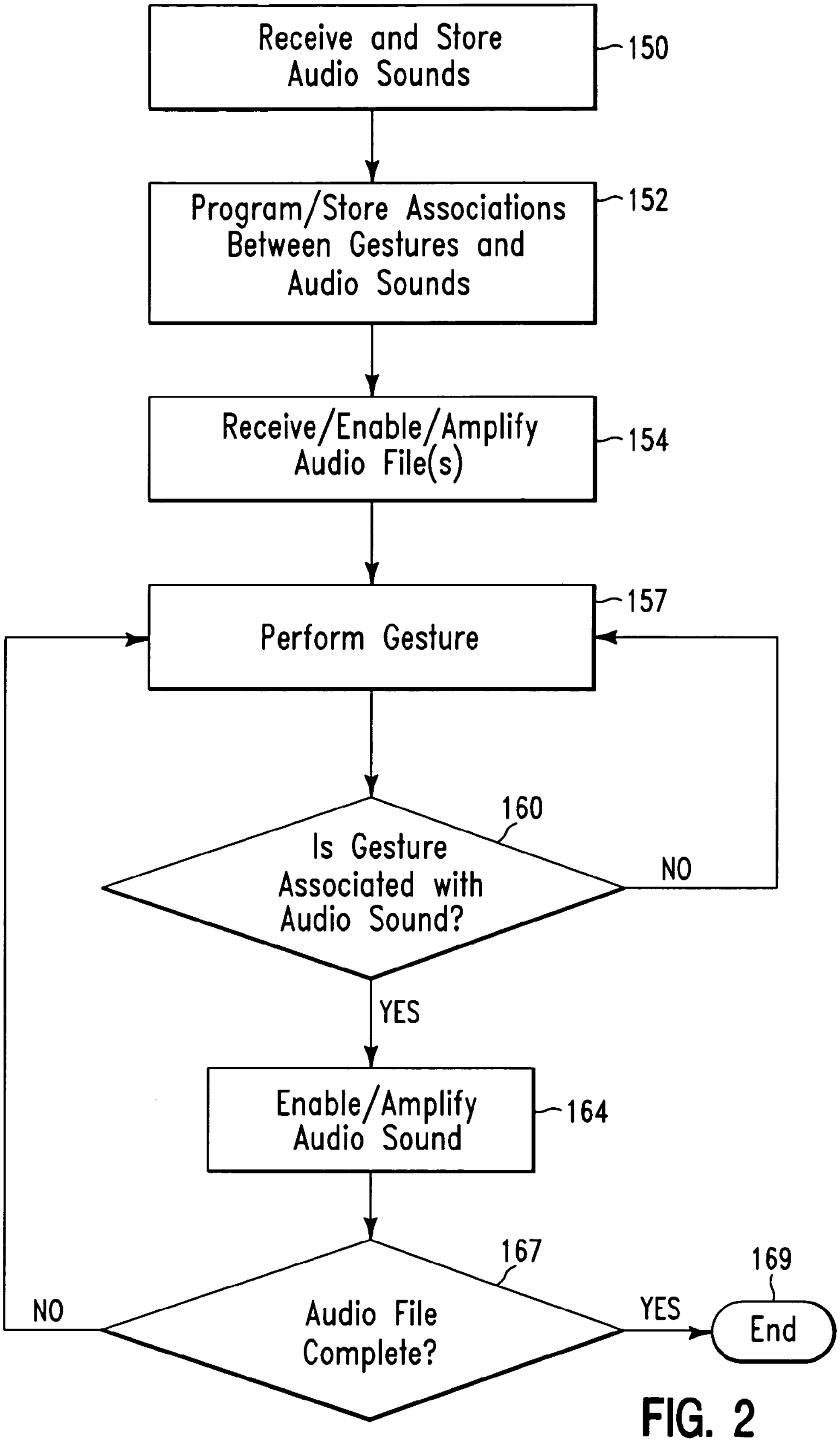
FIG. 2 illustrates a flow diagram describing an example of an overall programming/usage process for the audio device of FIG. 1, in accordance with embodiments of the present invention.

FIG. 2 illustrates a flow diagram describing an example of an overall programming/usage process for audio device 100 of FIG. 1, in accordance with embodiments of the present invention. In step 150, audio sounds are received by audio device 100. The audio sounds are received from external audio sound sources 140 and/or synthesizer component 104. The audio sounds are stored in database 107 within memory device 150. In step 152, associations between user gestures and audio sounds are programmed as described in detail with respect to FIG. 3, infra. In step 154, audio files (e.g., music such as, inter alia, a song) are received/enabled (played for the user) and amplified by audio device 100 for the user. As described, supra, in the description of FIG. 1, the audio files may be retrieved (i.e., if there are not any existing copyright and/or licensing issues) from external audio/video file source (s) 118 as a live stream of audio (e.g., an RF or satellite radio broadcast) or the audio files from may be retrieved from database 124 in memory device 150. In step 157, the user performs a gesture using sensor device 101. In step 160, gesture interpreter 103 processes the gesture and searches database 155 to determine if the gesture is associated with any stored audio sounds in database 107. If in step 160, gesture interpreter 103 determines that the gesture is not associated a stored audio sound in database 107 then step 157 is repeated. If in step 160, gesture interpreter 103 determines that the gesture is associated a stored audio sound in database 107 then the associated audio sound is enabled, integrated with the audio file, and amplified in step 164. In step 167, it is determined whether the amplified audio file (e.g., music such as, inter alia, a song) has finished playing. If in step 167, it is determined that the amplified audio file has not finished playing then step 157 is repeated. If in step 167, it is determined that the amplified audio file has finished playing then the process ends in step 169.

Figure 3:
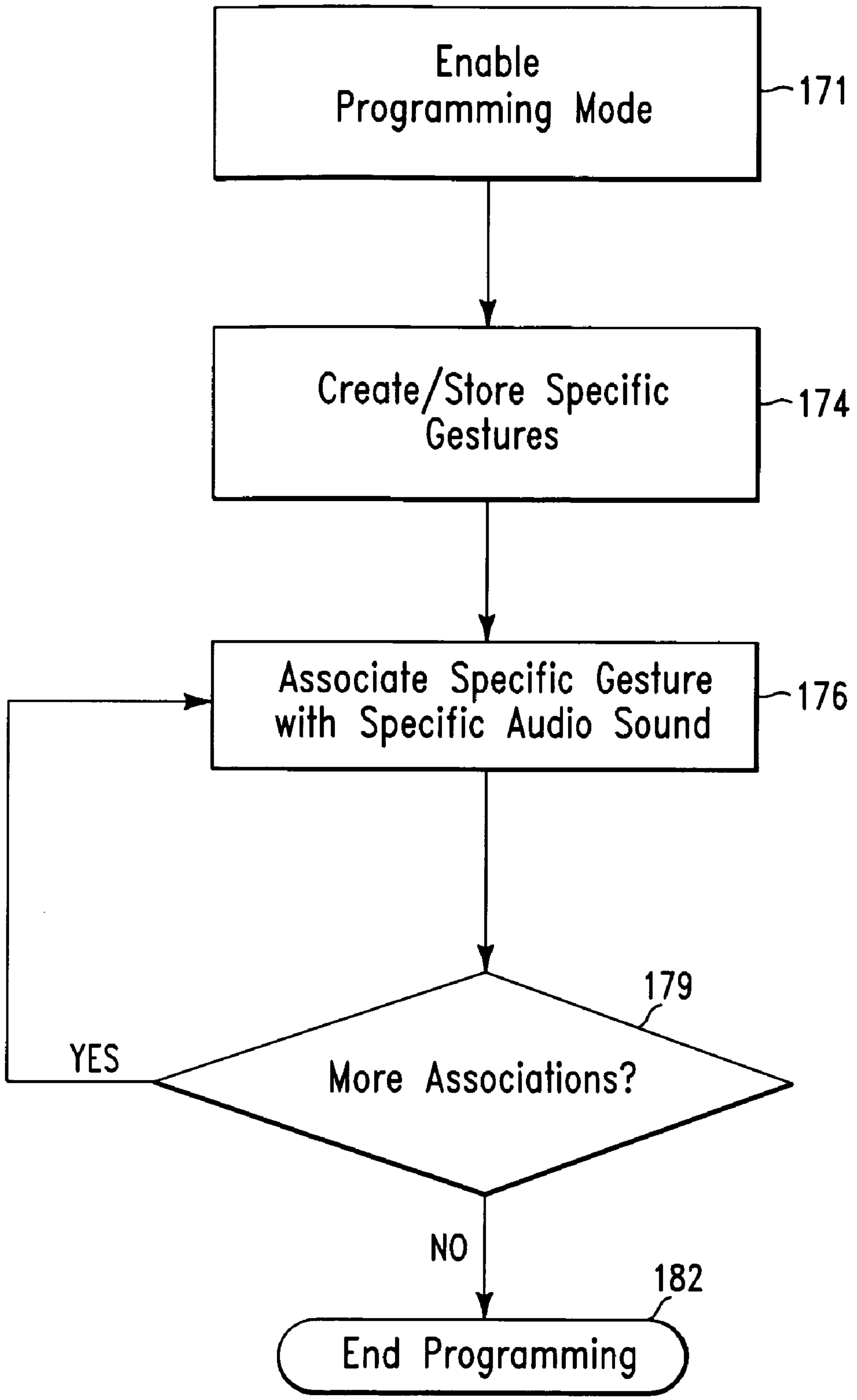
FIG. 3 illustrates a flow diagram describing an associations programming process for the audio device of FIG. 1, in accordance with embodiments of the present invention.

FIG. 3 illustrates a flow diagram describing an associations programming process for audio device 100 of FIG. 1, in accordance with embodiments of the present invention. The flow diagram in FIG. 3 describes step 152 in FIG. 2. In step 171, a programming mode for audio device 100 is enabled. In step 174, the user creates (performs) specific gestures using sensor device 101. The specific gestures are stored in database 155. The gestures may be divided in to groups comprising specific gesture types as described, supra, in the description of FIG. 1. In step 176, the user enables associations component 130 and associates a specific gesture with a specific audio sound stored in database 107. Additionally, modified associated audio sounds may be programmed based on a sensitivity of sensor device 101 and biometric data for the user as described, supra. In step 179, the user determines if they want to program another association between a gesture and an audio sound. If in step 179, the user would like to program another association then step 176 is repeated. If in step 179, the user would not like to program another association then the process ends in step 182.

Figure 4:
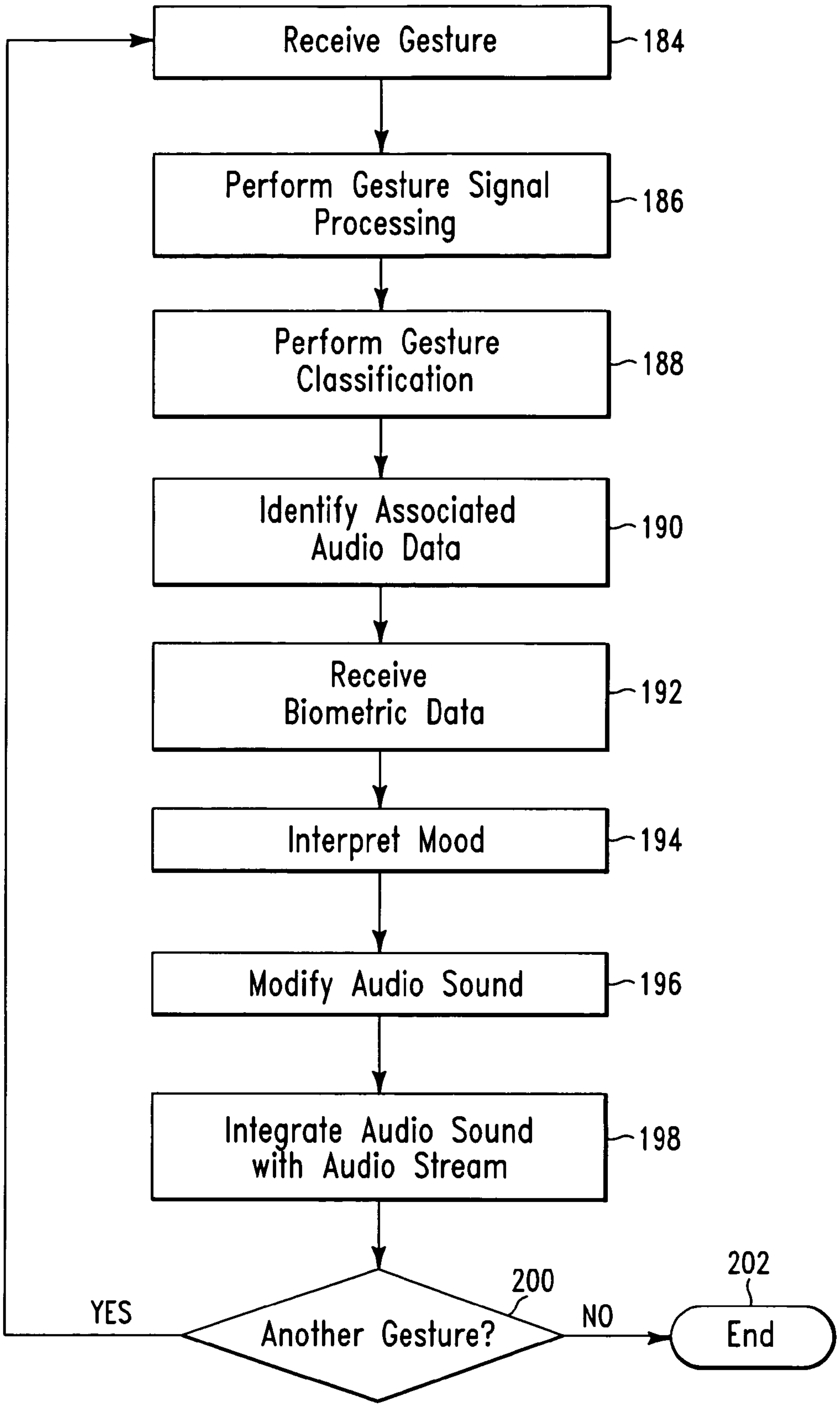
FIG. 4 illustrates a flow diagram describing a usage process for the audio device of FIG. 1, in accordance with embodiments of the present invention.

FIG. 4 illustrates a flow diagram describing a usage process for audio device 100 of FIG. 1, in accordance with embodiments of the present invention. In step 184, a user gesture is received by gesture interpreter 103. In step 186, gesture interpreter 103 processes the gesture (i.e., transforms the physical gesture into a mathematical format) and determines the gesture type. In step 188, the gesture is classified with a specific gesture type group. For example, circular movements, triangular movements, cross movements, quickly accelerating movements, high pressure movements, low pressure movements, etc. In step 190, an associated audio sound/segment in database 107 (i.e., from the programming process of FIG. 3) is identified (and attached to the gesture). In step 192, biometric data regarding the user is received by gesture interpreter 103 from biometrics component 105. In step 194, gesture interpreter 103 using the biometric data, determines the user's mood. In step 196, the audio sound and/or audio file/stream is modified in response to the user's mood. The audio sound may be modified in any manner. For example, an audio level for the audio sound may modified, a different audio sound from database 107 may be substituted for the associated audio sound, an audio level for the audio stream may modified, etc. In step 198, the audio sound is integrated with the audio file/stream. In step 200, the user determines if another gesture will be performed. If in step 198 the user determines that another gesture will be performed, then the user performs another gesture and the process repeats step 184. If in step 198 the user determines that another gesture will not be performed, then the process ends in step 202.

Figure 5:
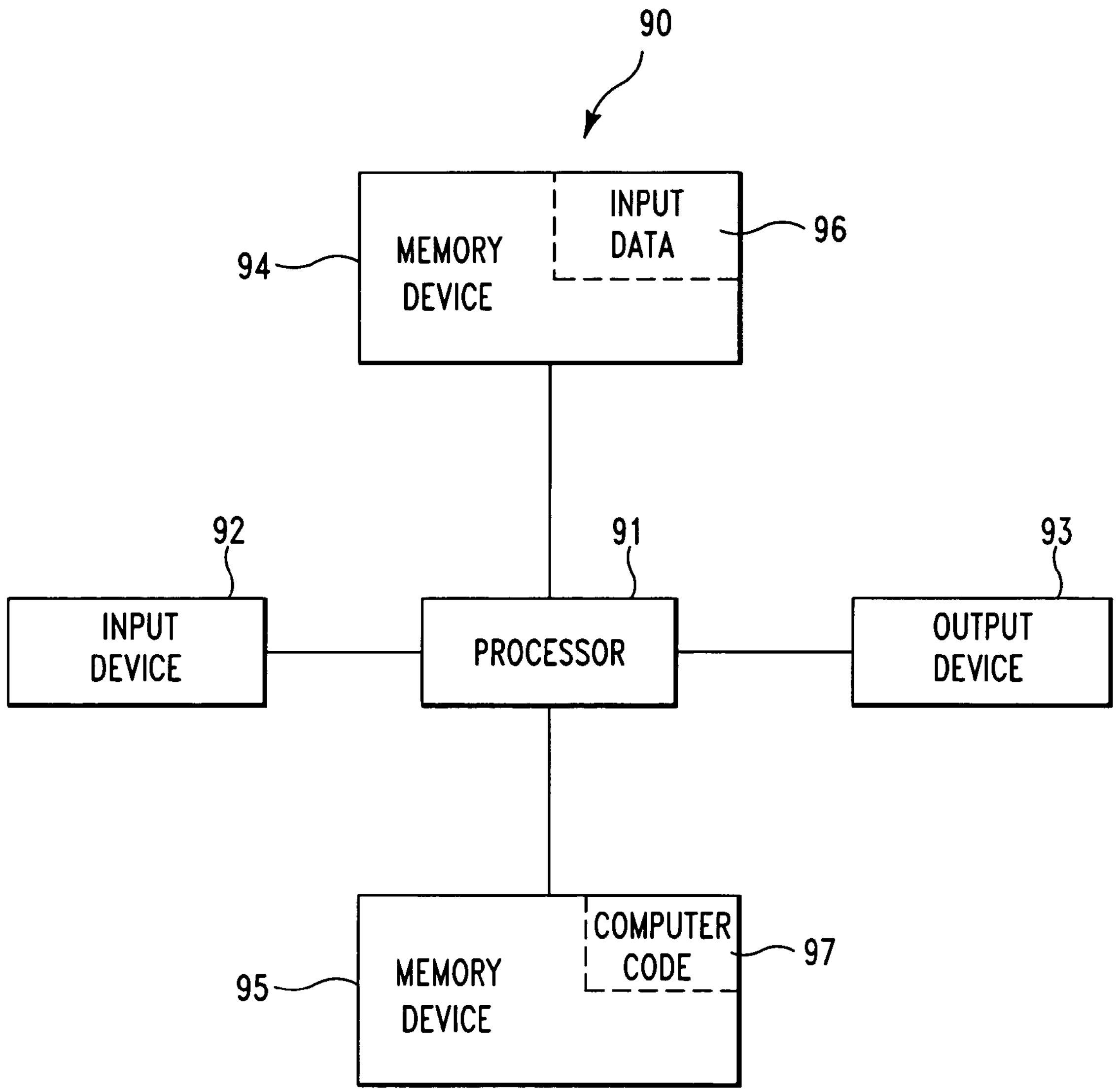
FIG. 5 illustrates a computer system used for associating user gestures with audio sounds, in accordance with embodiments of the present invention.

FIG. 5 illustrates a computer system 90 that may comprised by the audio device 100 of FIG. 1 for associating user gestures with audio sounds, in accordance with embodiments of the present invention. Computer system 90 comprises a processor 91, an input device 92 coupled to processor 91, an output device 93 coupled to processor 91, and memory devices 94 and 95 each coupled to processor 91. Input device 92 may be, inter alia, a keyboard, a mouse, etc. Output device 93 may be, inter alia, a printer, a plotter, a computer screen (e.g., monitor 110), a magnetic tape, a removable hard disk, a floppy disk, etc. Memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. Memory device 95 includes a computer code 97. Computer code 97 includes an algorithm for associating user gestures with audio sounds. Processor 91 executes computer code 97. Memory device 94 includes input data 96. Input data 96 includes input required by computer code 97. Output device 93 displays output from computer code 97. Either or both memory devices 94 and 95 (or one or more additional memory devices not shown in FIG. 5) may comprise any of the algorithms described in the flowcharts of FIGS. 2-4 and may be used as a computer usable medium (or a computer readable medium or a program storage device) having a computer readable program code embodied therein and/or having other data stored therein, wherein the computer readable program code comprises computer code 97. Generally, a computer program product (or, alternatively, an article of manufacture) of computer system 90 may comprise said computer usable medium (or said program storage device).

While FIG. 5 shows computer system 90 as a particular configuration of hardware and software, any configuration of hardware and software, as would be known to a person of ordinary skill in the art, may be utilized for the purposes stated supra in conjunction with the particular computer system 90 of FIG. 5. For example, memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:

providing an audio system comprising a sensing device and a memory device, said memory device comprising a list of groups of gesture types;

receiving by said audio system from an audio source enabled by a user, a first specified audio sound;

storing within said memory device, said first specified audio sound;

programming by said user, a first association between said first specified audio sound and a first specified gesture received by said sensing device;

associating said first specified gesture with a first group from said list of groups;

storing within said memory device, said first association in a first directory for said first group;

receiving by said audio system from said audio source enabled by said user, a second specified audio sound, wherein said second specified audio sound differs from said first specified audio sound;

storing within said memory device, said second specified audio sound;

programming by said user, a second association between said second specified audio sound and a second specified gesture received by said sensing device;

associating said second specified gesture with a second group from said list of groups;

storing within said memory device, said second association in a second directory for said second group;

amplifying by said audio system, an audio file, wherein said audio file differs from said second specified audio and said first specified audio sound;

using by said user, said sensing device to perform said first specified gesture;

recognizing by said audio system, said first specified gesture as a gesture from said first group;

enabling by said audio system in response to said recognizing said first specified gesture, said first specified audio sound;

integrating by said audio system in response to said enabling said first specified audio sound, said first specified audio sound with said audio file at a first specified interval of said audio file;

using by said user, said sensing device to perform said second specified gesture;

recognizing by said audio system, said second specified gesture as a gesture from said second group;

enabling by said audio system in response to said recognizing said second specified gesture, said second specified audio sound;

integrating by said audio system in response to said enabling said second specified audio sound, said second specified audio sound with said audio file at a second specified interval of said audio file, wherein said first specified interval differs from said second specified interval;

generating, by said audio system, an integrated audio file comprising said audio file, said first specified audio sound at said first specified interval, and said second specified audio sound at said second specified interval; and amplifying by said audio system, said integrated audio file.

2. The method of claim 1, wherein said sensing device is a touch pad sensor, wherein said first specified gesture comprises a first specified contact with said touch pad sensor, and wherein said first specified contact comprises a first specified amount of force.

3. The method of claim 1, wherein said audio file comprises music.

4. The method of claim 1, wherein said audio file is stored on a computer readable medium.

5. The method of claim 4, wherein said computer readable medium is selected from the group consisting of a hard drive, a compact disc, a flash memory device, a cassette tape, an erasable programmable read only memory device, and a random access memory device.

6. The method of claim 1, wherein said audio file comprises a broadcasted audio signal received by said audio system.

7. The method of claim 1, wherein said audio system comprises a system selected from the group consisting of a media player, a compact disc player, a personal digital assistant, and a radio receiver.

8. The method of claim 1, further comprising:

monitoring by said audio system, a biometric condition of said user; wherein said amplifying said first specified audio sound comprises amplifying said first specified audio sound to a specific audio level dependent upon said biometric condition of said user.

9. An audio system comprising a processor coupled to a memory unit and a sensing device, said memory unit comprising a list of groups of gesture types and instructions that when executed by the processor implement an association method, said method comprising;

receiving by said audio system from an audio source enabled by a user, a first specified audio sound;

storing within said memory device, said first specified audio sound;

programming by said user, a first association between said first specified audio sound and a first specified gesture received by said sensing device;

associating said first specified gesture with a first group from said list of groups;

storing within said memory device, said first association in a first directory for said first group;

receiving by said audio system from said audio source enabled by said user, a second specified audio sound, wherein said second specified audio sound differs from said first specified audio sound;

storing within said memory device, said second specified audio sound;

programming by said user, a second association between said second specified audio sound and a second specified gesture received by said sensing device;

associating said second specified gesture with a second group from said list of groups;

storing within said memory device, said second association in a second directory for said second group;

amplifying by said audio system, an audio file, wherein said audio file differs from said second specified audio and said first specified audio sound;

using by said user, said sensing device to perform said first specified gesture;

recognizing by said audio system, said first specified gesture as a gesture from said first group;

enabling by said audio system in response to said recognizing said first specified gesture, said first specified audio sound;

integrating by said audio system in response to said enabling said first specified audio sound, said first specified audio sound with said audio file at a first specified interval of said audio file;

using by said user, said sensing device to perform said second specified gesture;

recognizing by said audio system, said second specified gesture as a gesture from said second group;

enabling by said audio system in response to said recognizing said second specified gesture, said second specified audio sound;

integrating by said audio system in response to said enabling said second specified audio sound, said second specified audio sound with said audio file at a second specified interval of said audio file, wherein said first specified interval differs from said second specified interval;

generating, by said audio system, an integrated audio file comprising said audio file, said first specified audio sound at said first specified interval, and said second specified audio sound at said second specified interval; and amplifying by said audio system, said integrated audio file.

10. The audio system of claim 9, wherein said sensing device is a touch pad sensor, wherein said first specified gesture comprises a first specified contact with said touch pad sensor, and wherein said first specified contact comprises a first specified amount of force.

11. The audio system of claim 9, wherein said audio file comprises music.

12. The audio system of claim 9, wherein said audio file is stored on a computer readable medium.

13. The audio system of claim 12, wherein said computer readable medium is selected from the group consisting of a hard drive, a compact disc, a flash memory device, a cassette tape, an erasable programmable read only memory device, and a random access memory device.

14. The audio system of claim 9, wherein said audio file comprises a broadcasted audio signal received by said audio system.

15. The audio system of claim 9, wherein said computing system comprises a system selected from the group consisting of an IPOD®, a compact disc player, a personal digital assistant, and a radio receiver.

16. The audio system of claim 9, wherein the method further comprises:

monitoring by said audio system, a biometric condition of said user; wherein said amplifying said first specified audio sound comprises amplifying said first specified audio sound to a specific audio level dependent upon said biometric condition of said user.

17. The method of claim 1, wherein said audio system further comprises an external noise compensation component, and wherein said method further comprises:

detecting, by said audio system, a noise external to said audio system; and increasing, by said external noise compensation component in response to said detecting, an audio level of said integrated audio file.

18. The method of claim 1, wherein said audio system further comprises an external noise compensation component, and wherein said method further comprises:

detecting, by said audio system, a noise external to said audio system;

decreasing, by said external noise compensation component in response to said detecting, an audio level of said integrated audio file; and integrating, by said external noise compensation component, said noise with said integrated audio file;

generating, by said audio system, a modified integrated audio file comprising said integrated audio file and said noise; and amplifying by said audio system, said modified integrated audio file.

* * * * *